Nov. 27, 1956  
A. H. HANSON  
2,772,096  
APPLIANCE HAND TRUCK PROVIDED WITH STAIR-CLIMBING ATTACHMENT  
Filed June 15, 1953  
5 Sheets-Sheet 2

INVENTOR.  
ALFRED H. HANSON  
BY  
Mock & Blum  
ATTORNEYS

Nov. 27, 1956 A. H. HANSON 2,772,096
APPLIANCE HAND TRUCK PROVIDED WITH
STAIR-CLIMBING ATTACHMENT
Filed June 15, 1953 5 Sheets-Sheet 5

INVENTOR
ALFRED H. HANSON
BY Mock + Blum
ATTORNEYS

United States Patent Office 2,772,096
Patented Nov. 27, 1956

1

2,772,096

APPLIANCE HAND TRUCK PROVIDED WITH STAIR-CLIMBING ATTACHMENT

Alfred H. Hanson, Garrison, N. Y., assignor to The Fairbanks Company, New York, N. Y., a corporation of New Jersey Application June 15, 1953, Serial No. 361,435

11 Claims. (Cl. 280—5.24)

The present invention relates to improvements in hand trucks and in particular to a type of hand truck known as an "appliance truck" and used for manually lifting heavy loads up and over inclined irregular surfaces such as flights of stairs, street curbs and the like.

Conventional appliance trucks normally consist of a truck frame with handles, means such as a strap to bind a heavy load such as a refrigerator, or other heavy appliance to the truck frame, a pair of wheels, and a glider or crawler unit for traversing a flight of stairs or similar obstacle. Such conventional crawler units generally comprise a plurality of small, centrally-mounted rollers or wheels which engage and roll over the edges of the steps, or alternately comprise an endless belt arrangement which turns over the step edges. Both such arrangements have the disadvantage of providing a large amount of friction in the roller bearings or belt supports so that the operation of ascending a flight of stairs is difficult to perform by a single operator, if not impossible.

It is an object of the present invention to provide an appliance hand truck which has improved roller units which are so constructed as to present a minimum amount of friction, making possible manual operation by a single operator.

Another object of the invention is the provision of an appliance truck in which the roller units are movable as a whole relative to the truck frame to two selected positions, one of which is suitable for ascending a flight of stairs or the like, and the other of which is suitable for descending the stairs.

Still another object of the invention is the provision of an appliance truck of the character described which is provided with automatic brake means which become effective, when the roller units are moved to the position for ascending the stairs, to prevent the truck from rolling back down the stairs should the operator wish to rest the load, change his grip, etc.

A further object of the invention is the provision of an appliance truck which has improved belt or strap means for securing the load in a safely mounted position, these means being constructed to enable the belt or strap to be tightened in an infinitely variable manner and to eliminate dangerous ratchet pawls, toggles, buckles, etc.

Other objects and advantages of the invention will be apparent in the course of the following specification when taken in connection with the acompanying drawings, in which.

2

Figure 1:
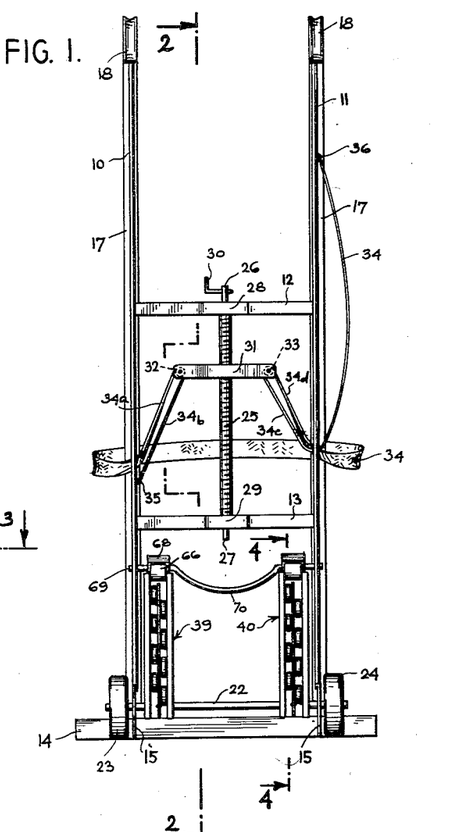
Fig. 1 is an elevation of the appliance truck of the invention as viewed from the rear thereof.
Figure 2:
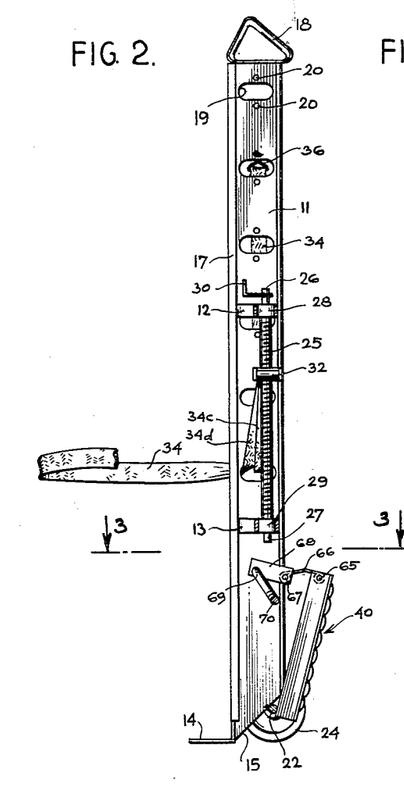
Fig. 2 is a section taken along line 2—2 of Fig. 1.
Figure 3:
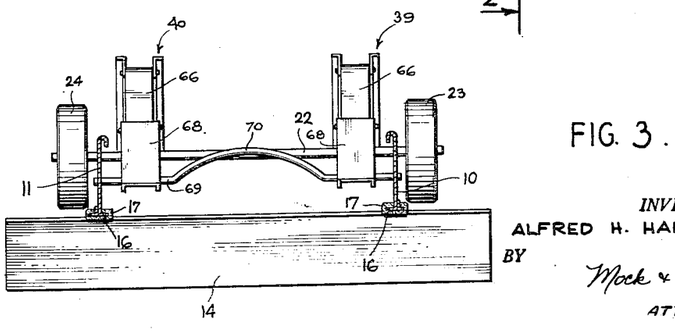
Fig. 3 is an enlarged section taken along line 3—3 of Fig. 2.

Referring to the drawings and particularly to Figs. 1–3, the appliance truck has a metal frame comprising a pair of spaced flat side plates or stringers 10 and 11 connected intermediate their ends by a pair of spaced cross bars 12 and 13 and also connected at their bottom ends by an L-shaped nose-piece or platform 14. Each stringer 10 and 11 has an inclined bottom edge 15 and a flat transverse flange 16 extending along its front edge which may be formed by bending the front end of the stringer to form a perpendicular flange and securing an angle iron in alinement therewith, as shown in Figs. 2 and 3. The front end flange 16 of each stringer 10 and 11 is covered by a tube 17 of flexible and resilient material such as rubber, to prevent injury to the surface of appliances mounted on the truck. Each stringer 10 and 11 also has an open triangular hand grip 18 at its top end, and a plurality of elongated openings 19 spaced along its length, each opening 19 being bordered by a pair of small circular apertures 20.

A cylindrical rod 22 is rigidly and immovably fixed adjacent each end to the inclined bottom edges 15 of the stringers 10 and 11. The rod 22 serves as the axle for a pair of wheels 23 and 24 which are rotatably mounted at the ends thereof.

A threaded shaft 25 is rotatably mounted between the cross bars 12 and 13 by means of terminal stub portions 26 and 27 which extend through respective bearings 28 and 29 in said cross bars. To the top stub portion 26 is attached a handle 30 by means of which the shaft 25 may be manually rotated. The threaded shaft 25 passes through a threaded central opening in a flat adjusting bar 31 which has pulley rollers 32 and 33 mounted at each end. The adjusting bar 31 is utilized for tightening a retaining belt or strap 34 which passes around and holds an appliance mounted on the hand truck. In the use of the truck in moving a heavy appliance up or down a flight of stairs or the like, it is essential that the appliance be held tightly and securely against the truck frame without loosening, since back lash and wobbling caused by loosely-mounted appliances can be inherently dangerous in causing the operator to lose his balance or the truck to get out of control.

Fig. 1 shows a position which the retaining strap 34 would assume when it is arranged to hold a heavy object or appliance mounted on the truck. The ends of the strap 34 are provided with respective hooks 35 and 36 which are sized for attachment to the small apertures 20 of the stringers 10 and 11. When an appliance is loaded on the truck so that it rests upon the platform 14, the hook 35 at one end of the belt is attached to one of the apertures 20 of the stringer 10. The belt is then passed around the pulley roller 32 of adjusting bar 31 and is drawn through one of the elongated openings 19 of the stringer 10, thus forming belt sections or segments 34a and 34b extending from opposite sides of the pulley roller 32. The free end of the belt is then drawn around the front and sides of the appliance mounted on the truck and is drawn through an elongated opening 19 of the stringer 11, thus defining central retaining strap section 34a. The free end of the belt is then looped over the roller 33 of adjusting bar 31 and back through the same opening 19 in stringer 11, forming belt sections 34c and 34d leading from the pulley roller 33. At this point the free end of the belt is pulled so that the belt section 34a is drawn tight around the mounted appliance and the terminal hook 36 is attached to the uppermost possible opening 20 in the stringer 18 so that the adjacent end of the belt is as taut as possible. The final tightening of the belt 34 is accomplished by turning of the handle 26 in a direction to cause the threaded shaft 25 to turn relative to the threaded opening in the adjusting bar 31 and to raise the latter. It will be noted that the belt sections 34a, 34b, 34c and 34d will prevent the adjusting bar 31 from turning with the threaded shaft 25.

When the adjusting bar 31 is raised, it first tensions the belt 34 by drawing the retaining section 34a thereof tightly around the mounted appliance. This is effected by lengthening the sections 34a, 34b, 34c and 34d. Considering the sections 34a and 34b leading from the pulley roller, 32, if the adjusting bar 31 is raised one inch, for example, the sections 34a and 34b must each be lengthened approximately one inch, and since the section 34b is fixed, it results that the section 34a must supply this increased length and must be drawn through its opening 19 in stringer 10 by approximately two inches. This will decrease the length of the central retaining section 34a by the same amount. The belt sections 34c and 34d leading from the pulley roller 33 will likewise both be lengthened by approximately one inch each, so that the unattached belt section 34d is drawn through its elongated opening 19 in stringer 11 for a distance of approximately two inches, so that the length of the belt retaining section 34a is decreased by an additional two inches, or a total of substantially four inches. Thus, the pulley arrangement provided by rollers 32 and 33 results in the shortening of the belt central retaining section 34a by an amount which is substantially four times the amount by which the adjusting bar 31 is raised, so that it is generally necessary to rotate the handle 26 only a short time to effect the final secure adjustment of the belt 34 around the appliance. This arrangement has the additional advantage of causing the belt to be pulled in or retracted from each side of the appliance with equal tension, unlike conventional appliance trucks in which the belt is fixed at one end so that when it is tightened it must scuff or rub against the appliance. Such friction, which is caused by the warping of the belt around its edges, prevents proper belt tightening.

To enable the truck to be used for carrying a heavy load up or down a flight of stairs or the like, the truck frame is provided with a pair of roller units mounted adjacent the lower ends of the stringers 10 and 11. Three different types of roller units are shown in the drawings and will be presently described. Each of these types has, however, similar general structural characteristics and a similar manner of operation. Each roller unit generally comprises a housing in which two adjacent longitudinal rows of rollers are mounted in staggered relation to each other and with their bottom surfaces on a common plane. Each roller is adapted on contacting the edge of a step being traversed, to roll along the housing carrying the step edge until the step engages the next roller, in the adjacent row, at which time the first roller rises so that its bottom surface is located above the common plane of the other rollers and the second roller is left free to carry the stair edge to the next succeeding roller.

Figs. 4–8 show in detail a pair of identical roller units 39 and 40 which are mounted in parallel alignment at either side of the machine inwardly and adjacent the respective stringers 10 and 11. Since the roller units 39 and 40 are identical in construction, for convenience only one will be described fully, it being intended that this description will apply equally to both units, and the same reference numerals of like parts will be applied to both units.

The roller unit 40, for example, has a housing 41 which comprises a pair of spaced, parallel, rectangular side walls 42 and 43 joined at their upper ends by an integral top wall 44. The housing 41 thus has an open bottom end and open front and rear ends. The bottom edges of the side walls 42 and 43 may each be provided with outturned lateral flanges 45 in order to eliminate sharp edges which may cut or otherwise damage the stair treads when the truck is in use.

The housing 41 also includes a central longitudinally-extending partition wall 46, secured to and depending from the center of the top wall 44. This central wall 46 divides the housing 41 into a pair of longitudinal roller compartments 47 and 48. In each compartment is mounted a longitudinally-aligned row of identical rollers, each of the two rows having an equal number of rollers. The drawings show a preferred arrangement in which four rollers are provided in each row, the row contained in compartment 47 consisting of rollers 50a, 50b, 50c and 50d, and the row contained in compartment 48 consisting of rollers 50e, 50f, 50g and 50h.

Figure 6:
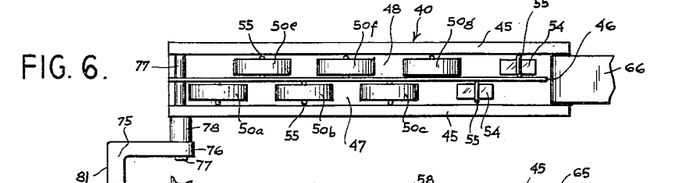
Fig. 6 is a bottom plan view of one of the roller units shown in Fig. 1.
Figure 7:
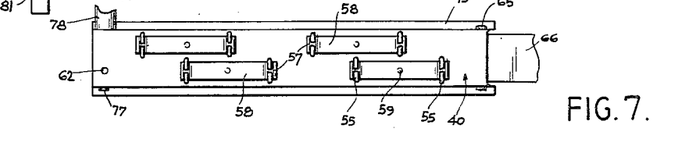
Fig. 7 is a top plan view of the same roller unit.

The rollers of one row are mounted in staggered relationship to the rollers of the other row, with the ends of the rollers of opposite rows overlapping as clearly shown in Fig. 6.

Each of the rollers is identical in construction and comprises a cylindrical metal core 51 covered by a cylinder 52 of rubber or other resilient material having a relatively high coefficient of friction. The metal core 51 has an enlarged central circular opening 53.

Figures 4, 5:
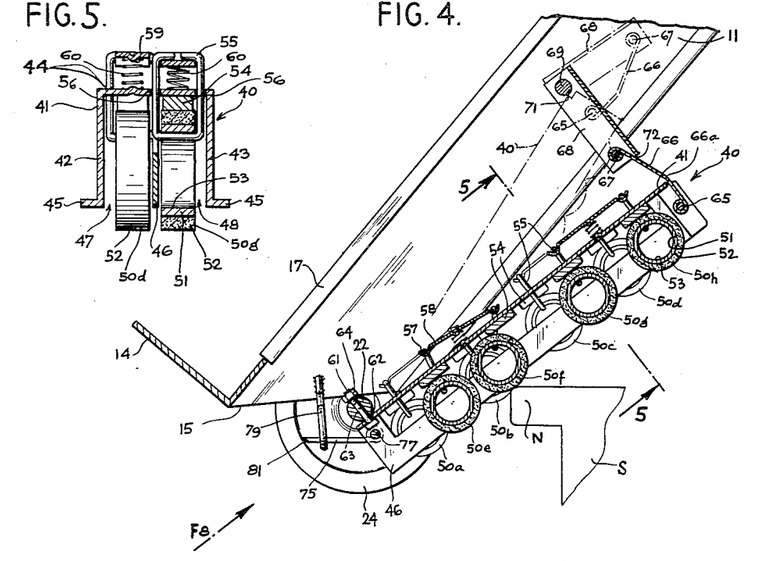
Fig. 4 is an enlarged section of a roller unit and adjacent parts, taken along line 4—4 of Fig. 1.
Fig. 5 is a section taken along line 5—5 of Fig. 4.

Each roller is normally held pressed against the bottom surface of a respective flat metal block 54 secured to the inner surface of the housing top wall 44. The blocks 54 are longitudinally aligned in two respective rows located within roller compartments 47 and 48, as shown in Fig. 4. Each block 54 has a length which is less than the diameter of a roller, and the blocks in the same row are spaced from each other by a sufficient distance to enable a roller to roll over the corner of its block and partially enter the space between its block and the next adjacent block in the same row.

Each roller is normally held pressed against the bottom surface of its respective block 54 by mounting means consisting of a rectangular open clip 55 formed of bent wire stock, the bottom end bight of which extends through the central opening 53 of the roller. The side arms of the clip 55 extend slidably through respective small slots 56 in the housing top wall 44, so that the top end of said clip is located exteriorly of said housing and above said top wall. The top end bight of each clip 55 is seated in a groove 57 at one end of a flat plate 58. The plates 58 have a central depending dimple or projection 59 which acts as a seat for one end of a coil spring 60. The other end of said coil spring 60 is seated on a similar dimple or projection located on the housing top wall 44.

The four rollers in each row are divided into groups of two adjacent rollers for mounting purposes, the two rollers in each group being mounted by means of their respective clips 55 to opposite ends of one of the plates 58. Specifically, the rollers 50a and 50b are mounted on one of the plates 58, the rollers 50c and 50d on another plate, the rollers 50e and 50f on another plate, and rollers 50g and 50h on still another plate.

Each plate 58 is normally urged upwardly at its center by its respective compressed coil spring 60 so that the two clips 55 at the ends of said plate are normally biased to raised positions in which their top end bights are spaced well above the housing top wall 44. This normal position is illustrated by the plate 58 at the right hand side of the housing shown in Fig. 4. In this position the plate 58 is substantially parallel to the upper surface of top wall 44, the axes of the two clips 55 are substantially normal to the top wall 44, and the bottom bight of each clip 55 is in engagement with the top inner peripheral area of a respective roller core 51 and presses the roller against the bottom surface of its respective block 54. When the roller assembly is not in use, all of the plates 58 and their associated parts are in this normal position, and since the blocks 54 are all made of a uniform thickness, the bottom circumferential surfaces of all the rollers are on a common transverse plane.

Since each plate 58 is mounted at its center on a coil spring 60, it will be seen that the plate 58 may act as a lever, pivoting downwardly at either end with the top of spring 60 acting as a fulcrum. The movement of plate 58, however, is not a true lever action since as one end of the plate 58 is lowered, the clip 55 at the opposite end of the plate prevents this opposite end from lowering. The pivoting movement of one end of the plate 58 is accomplished by further compressing of the spring 60.

The roller units 39 and 40 are mounted at the bottom of the hand truck frame at a slight angle to the stringers 10 and 11, in a manner which will be presently described.

When the truck is loaded with a heavy appliance, it is tilted by the operator and drawn or pushed along on the wheels 23 and 24 until a flight of steps or the like are encountered. At the time, the operator backs the hand truck toward the steps until the roller units 39 and 40 engage the corner or nosing of the first step. One of the rollers on each roller unit 39 and 40 is thus in abutment with the step nosing or corner, the particular roller depending upon the height of the step riser, but generally being the end roller 50h. After the roller units have engaged the first step, the operator ascends the stairs, pulling the hand truck after him, the roller units engaging each of the steps in succession.

As a roller engages a step corner edge, its outer covering 52 frictionally engages and holds to the corner edge, and as the hand truck is drawn further upwardly, each roller unit 39 and 40 moves relatively to its frictionally engaged roller which pivots around the step corner edge. In effect, this has the appearance of the frictionally-engaged roller moving relative to the roller unit, and for clarity of explanation, the roller action will be described as if this were the case.

Fig. 4 shows one of the rollers 50f of roller unit 40 in engagement with the upper corner of the nosing N of a step S. As the roller unit 40 moves upwardly past the step S, the roller 50f being frictionally engaged and held by the step corner merely pivots around this corner, but has the effect of rolling relative to the roller unit housing. The roller 50f thus rolls along the bottom surface of its block 54 until it reaches the end of the block, as shown in Fig. 4, and begins to turn the corner of the block 54, entering the open space between its block and the next succeeding block in the same row. As the roller 50f enters this space, it rises so that its bottom surface is raised above the common plane of the bottom surfaces of the other rollers in unit 40. The spacing of the blocks 54 is such that just as the roller 50f begins to rise, the adjacent roller 50b in the opposite row has been moved into frictional engagement with the corner edge of step S, so that the weight of the hand truck is shifted from roller 50f to roller 50b. As the roller 50b begins to travel along its block 54, the roller 50f which is already located above the plane of the other rollers can clear the step S and snap back to its original position centered on its block 54 under tension of its associated spring 60. The return of the roller 50f is made possible by the fact that the step edge first engages the succeeding roller 50b at a point on its circumference above and to the right of its bottom circumference, the point of engagement being shown in Fig. 4. As the roller 50b begins its rolling movement, the edge of step S travels relatively downward to the lowermost point of the circumference of roller 50b, and since this point is on the common plane of the bottom circumferential surfaces of the rollers and the roller 50f had previously been brought to its raised position, the roller 50f is free to snap back free of the stair S.

The main function of block 54, therefore, is to prevent simultaneous contact of the stair nosing with two adjacent rollers. Such contact would cause one of the rollers to over extend its normal or intended travel, causing it to interrupt the free motion of the truck when the limit of its clip 55 is reached. In actual construction, the thickness of the blocks 54 permits the rollers to drop slightly beneath the flange 45 of the roller unit housing so that under no condition can the clip 55 be strained or bent.

The roller 50b now travels through the same cycle as described in connection with roller 50f, and as it begins to turn the corner of its block 54, it passes the step edge to the next succeeding roller 50e and the cycle is repeated until the last roller 50a passes the step edge to the wheel 24. The operator may then roll the wheel 24 over the corner of step S and upon the step tread, wheeling the hand truck along the step tread until the roller units engage the next step on which the raising operation is repeated.

Thus, as the roller unit 40 traverses a step, the step edge is in effect passed from roller 50h to roller 50d, to roller 50g, and so on in succession until it finally engages the wheel 24. The same operation is performed simultaneously by the rollers of roller unit 39 at the other side of the truck frame until the step engages wheel 23 on that side. The movement of the truck along the step edge is a smooth, unbroken motion since each roller engages the step edge at a point not far above the bottom circumferential surface or crest of the roller so that the hand truck is not raised appreciably as the step edge travels to the bottom surface of the roller. The raising operation is also an easy one even with a heavy load and can be performed with a single operator. This is made possible by the fact that the force exerted on each roller is substantially tangential to it, enabling the roller to roll freely along its block. In contrast, in appliance trucks having rollers mounted for rotation on a central axis, the force is mostly radial, being concentrated on the bearing axis of the roller and making rotation of the roller difficult.

The roller units 39 and 40 are mounted on the hand truck frame in a manner to be moved between an extended and a retracted position. For this purpose the front end of each housing is attached to the axle 22 by means of an elongated bolt 61 which extends through an opening 62 in the housing top wall 44 and also through a corresponding diametral bore 63 in the axle 22, as shown in Fig. 4. A nut 64 which holds the bolt 61 in its mounted position, is loosely attached so that the roller unit housing may have a limited pivoting movement with the bolt 61 as its pivoting axis. The other end of each roller unit housing has a fixed pin 65 secured to and extending laterally between its side walls 42 and 43. The looped end of a flat plate 66 rotatably encircles the pin 65. The opposite looped end of said plate 66 rotatably encircles a pin 67 fixed between the two side arms of a rectangular bracket 68 of U-shaped cross-section. The brackets 68 attached to each roller unit are rigidly mounted at the opposite ends of a crank bar 69 which has a bowed central section 70 and planar ends which are journalled in the stringers 10 and 11, as shown in Figs. 1 and 3.

The roller units 39 and 40 may be moved simultaneously between their extended position shown in full line in Fig. 4, and their retracted position shown in broken line. In the extended position, the brackets 68 are substantially perpendicular to the axis of the stringers 10 and 11, the flat plates 66 are substantially aligned with the brackets 68 and act as extensions thereof, and the end of each roller unit housing is spaced rearwardly from the stringers 10 and 11. In this position, the bowed central portion 70 of crank bar 69 is directed downwardly as shown in Fig. 2.

In the normal use of the hand truck for carrying a load over a level ground surface, the roller units 39 and 40 may be set in their retracted positions in which substantially their entire housings are inset between the respective stringers 10 and 11 and out of the way of the operator's feet as he pushes the truck. This retracted position is also used when descending a flight of stairs, as will be presently described.

The roller units 39 and 40 may be brought to their retracted positions while the operator is in the act of pushing or pulling the truck. For this purpose, the bowed central portion 70 of crank bar 69 is engaged by the operator's foot and turned until it is directed upwardly. Turning of crank bar 69 also turns the fixed brackets 68 to their broken line positions of Fig. 4 in which they are substantially axially alined with the stringers 10 and 11, the flat plates 66 pivoting with relation to both the brackets 68 and the roller units, and taking the position shown in broken line in Fig. 4. In arriving at this position, the plates 66 carry the ends of the respective roller units 39 and 40 upwardly, pivoting said roller units to their fully retracted positions shown in broken line in Fig. 4. In this retracted position, the roller unit housings are substantially aligned with the stringers 10 and 11 and their rollers project only a short distance behind said stringers.

When the roller units are pivoted to their fully retracted position, further inward pivoting is prevented by contact between the crank bars 69 and the end of the roller unit housings at a respective point indicated by reference numeral 71 in Fig. 4. When the roller units are pivoted to their extended positions, further turning movement is prevented by engagement of the flat plates 66 with the bottom edges of brackets 68 at contact points designated by reference numeral 72. Each flat plate 66 has an angular bend 66a slightly below its center, so that in the extended position of the roller units the weight of the load upon the roller units would maintain the plate 66 in firm engagement with the edge of bracket 68 at contact point 72, and thus prevent the bracket 68 from accidentally pivoting in a counterclockwise direction to bring the roller units back to their retracted positions.

The hand truck may also be provided with brake means to prevent the truck from rolling backward down the stairs should it get out of control or slip from the hands of the operator. The brake means comprises a pair of L-shaped metal members 75, one leg of which is looped at 76 to pivotally encircle the end of a rod 77 which extends through the forward end of the housing of each respective roller unit 39 and 40, and is rigidly secured thereto. The L-shaped member 75 is spaced from the wall of its roller unit housing by a spacer sleeve 78. This pivotally-attached leg of member 75 extends loosely through a guide loop 79 which has extensions 80 embracing each respective stringer 10 and 11. The free transverse leg of each L-shaped member 75 has a front bevelled edge 81. In the extended position of the roller units, each pivoted L-shaped member 75 lies loosely within its guide loop 79 with its bevelled edge 81 resting lightly upon the inner circumference of the respective wheel 23 and 24. Each edge 81 is bevelled in such a direction that they do not retard clockwise or rearward rotation of the wheels 23 and 24 when the truck is moving up a flight of stairs, so that the wheels will rotate upon encountering each stair tread to aid in the ascending operation. However, should the hand truck begin to slip downwardly, or should the operator desire to rest the truck on a stair tread, the brake prevents the wheels 23 and 24 from rotating forwardly or in a counterclockwise direction. A tendency to so rotate would cause the bevelled edge 81 to bite firmly into the rubber tires of the wheels 23 and 24, preventing any movement in that direction.

When the truck is used for carrying a load down a flight of stairs, or in the normal level-surface manner, it is of course essential that the wheels 23 and 24 be permitted to rotate free in a forward or counterclockwise direction. This is automatically accomplished when the roller units are pivoted to their retracted positions, this pivoting movement carrying the L-shaped members 75 rearwardly away from the wheel surfaces, and spacing the bevelled edges 81 from the inner wheel circumference.

Figure 9:
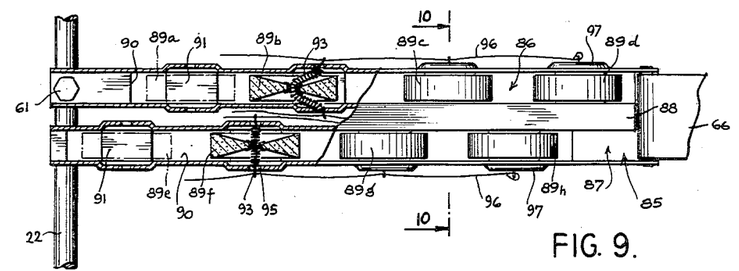
Fig. 9 is a bottom plan view of an alternate type of roller unit which may be employed in the hand truck of Fig. 1.
Figure 10:
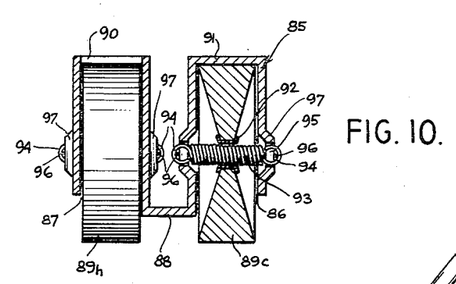
Fig. 10 is a section along line 10—10 of Fig. 9.
Figure 11:
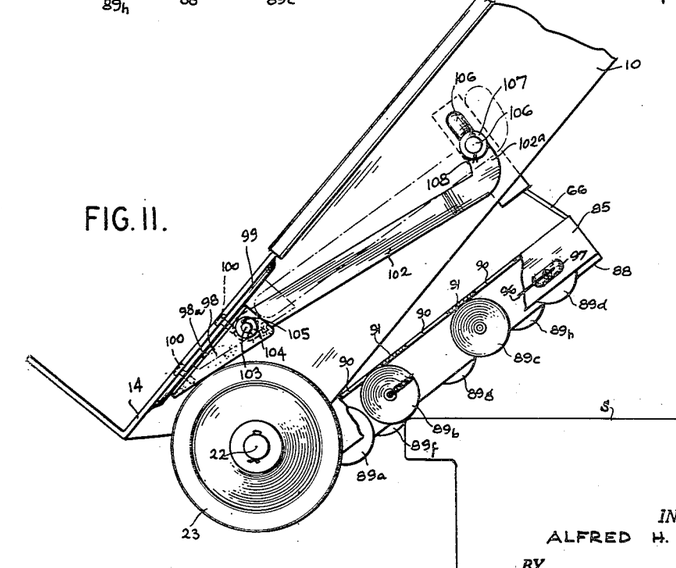
Fig. 11 is a side elevation of the lower portion of the hand truck showing a roller unit of Fig. 9 and a brake assembly mounted thereon, with a part of the roller unit broken away and shown in section to reveal internal construction.

Figs. 9–11 show a modified form of roller unit assembly with which the hand truck may optionally be provided. The roller unit assembly comprises a pair of identical roller units 85, each of which has an integral metal housing angularly bent in the shape shown in Fig. 10 to provide a pair of spaced parallel longitudinal roller channels 86 and 87, joined by an integral center plate 88.

Each roller channel 86 and 87 contains a plurality of rollers arranged in a longitudinal row. In Figs. 9 and 11, the channel 86 contains the rollers 89a, 89b, 89c and 89d, while the channel 87 contains the rollers 89e, 89f, 89g and 89h. The top wall of each roller unit channel 86 and 87 is interrupted by a series of evenly spaced openings 90 which extend the width of the channel and are sufficiently long to enable a roller to fit therewithin. The top wall portions 91 between the openings 90 constitute support platforms for the individual rollers in their mounted positions.

Each of the rollers is formed of an integral piece of rubber or other resilient and frictional material and shaped as shown in the sectional views of Figs. 9 and 10. Each roller has convex side faces forming a relatively wide outer circumference of slightly less width than the roller compartments 86 and 87, and an inwardly-tapered central section. Each roller has a central hole in which is set a hollow metal eyelet 92. A coil spring 93 extends through the eyelet 92 of each roller and serves as a resilient central mounting of said roller. The spring 93 has closed loops 94 at each end, which extend through suitably placed openings 95 in the side walls of the roller channels 86 and 87. A pair of metal wires 96 extend through the alined spring end loops 94 at the sides of each roller channel, as shown in Fig. 9, each wire 96 being secured at each end to the end rollers of each row.

Each roller is thus normally held by its spring 93 in a mounted position in which it is centered upon one of the top wall platform portions 91 with its upper circumferential surface pressed against said wall portion 91. It will be readily appreciated that these wall portions 91 and the openings 90 therebetween correspond to and have the same functions as the blocks 54 of the roller unit shown in Figs. 4–7. When each roller engages a step edge S, as is the case of the roller 89b shown in Fig. 11, its resilient mounting spring 93 expands, allowing the roller to travel along its wall portion 91 until it reaches the adjacent opening 90. When the roller begins to drop into the opening 90, the step edge will engage the next roller, in this case the roller 89f, and the roller 89b having risen above the plane of the other rollers, is clear of the step edge, and is returned to its original position by tension of the spring 93. In order to allow the springs 93 to expand as described, the side walls of the roller unit housings may be provided with outwardly-pressed elongated hollow bosses 97 at both sides of each spring 93, the ends of each spring 93 being secured at the center of said bosses. The bosses 97 are sufficiently deep and sufficiently long to enable the sides of the expanded spring 93 to be housed therein, thereby permitting the wide circumferential portions of the roller to move in its respective roller channel past these spring portions.

The operation of the roller unit 85 is substantially identical to the operation previously described in connection with the roller units 39 and 40 of Figs. 1–9. Figs. 12–15 show in sequence the progress of the roller units 85 in ascending and descending a flight of stairs. This operation will now be described in greater detail for a clearer understanding of the functioning of both the roller units 85 and the alternate roller units 39 and 40 of Figs. 1–9.

Figures 12, 13:
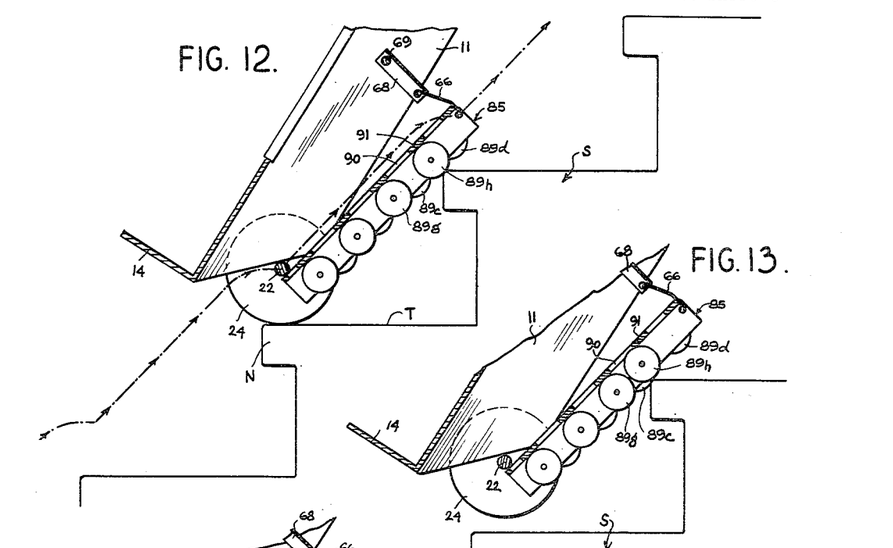
Figs. 12—14 are diagrammatic side elevations partially in section, showing a hand truck in three successive stages of ascending a flight of stairs.
Figures 14, 15:
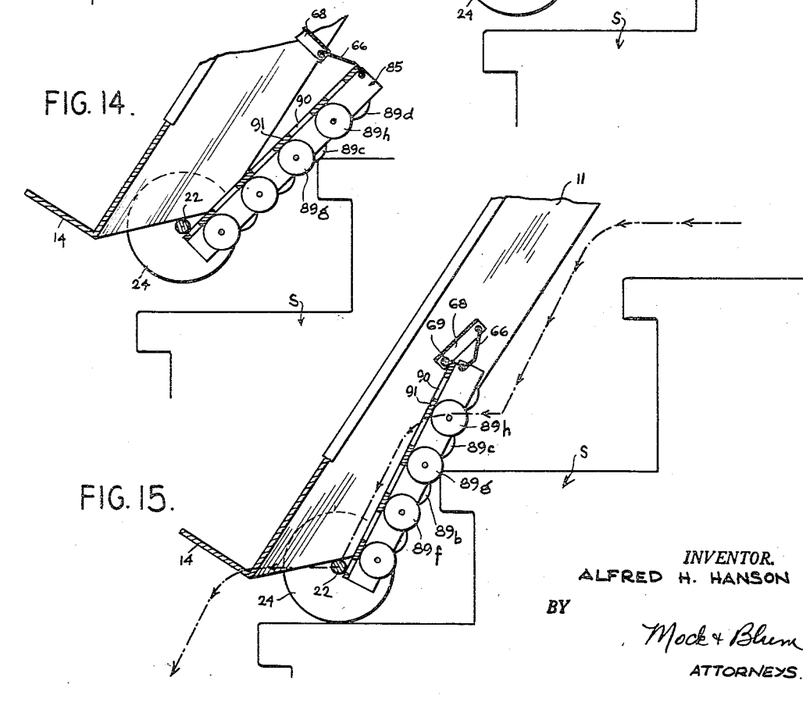
Fig. 15 is a similar diagrammatic elevation partially in section, showing the same hand truck in the process of descending a flight of stairs.

Fig. 12 is a diagrammatic view showing a flight of stairs and a hand truck in the process of ascending these stairs. The hand truck is provided with roller units 85 such as those shown in Figs. 9–11. The hand truck is shown resting upon one of the step treads of the flight of stairs with the roller unit 85 in its extended position and in engagement with the edge of the next step. Because the stair risers are short with relation to the length of the treads, the second roller 89b initially abuts the stair edge. Fig. 13 shows the same roller assembly 85 after the truck has been pulled a short way upwardly along the stair edge. In this view, the wheel 24 has moved above the step tread, and the full weight of the truck and and its load is upon the roller 89h and the corresponding roller of the opposite roller assembly which is not shown in these views. Since the roller 89h is frictionally held by the edge of the step, upward movement of the roller assembly moves the top wall platform portion 91 away from the wheel 89h and moves the open space 90 toward the area above the roller 89h. The roller 89h thus, in effect rolls to the edge of the wall portion 91 and around the corner of this wall portion partially into the opening 90, as shown in Fig. 12, rising above the plane of the other rollers. Simultaneously with this rising, the next succeeding roller 89c has moved into contact with the step edge. Fig. 14 shows the roller 89c as it is held by the step edge while the remainder of the roller assembly moves upwardly with relation thereto. In this view, the roller unit and truck have been raised slightly as the roller 89c rotates sufficiently to bring the step edge to the bottom of its circumference. This raising of the roller unit 85 relative to the step edge has permitted the mounting spring 93 to return the raised roller 89h to its original position. Further upward movement of the truck from the position of Fig. 14 will cause the stair edge to engage the roller 89g, releasing roller 89c, and so on in succession until the wheel 24 engages the step edge and is rolled thereover so that it rests on the step tread, at which time the entire cycle is repeated with the next higher step edge.

The arrow in Fig. 12 shows the path of the hand truck as it ascends the stairs. The arrow in Fig. 15 shows the path of the same hand truck when it is descending the flight of stairs. It will be noted that the angle of descent is more nearly vertical than the angle of ascent, since in descending the stairs, the roller units 85 are set in their retracted positions. This positions the wheels 24 and 25 well inwardly from the edge of the step when the wheels are lowered into contact with the step tread and is a safety feature of the hand truck, retarding the tendency of the descending wheels to slip over the edges of the steps. When the truck is descending the rollers move in the opposite direction and in the reverse order than they do in the act of ascending the stairs.

Figure 8:
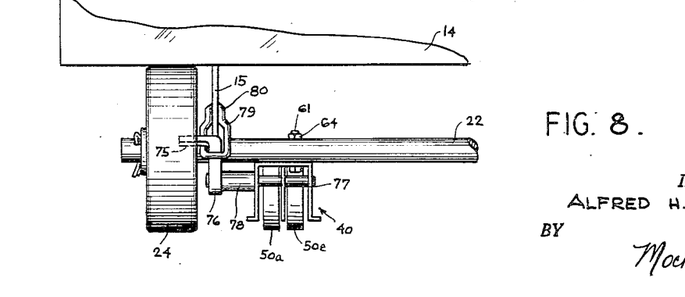
Fig. 8 is an end view of one of the roller units and adjacent parts of the hand truck as viewed along arrow F8 of Fig. 4.

The roller units 85 may be provided with the brake arrangement shown in Fig. 8 or optionally, may be provided with an alternate type of brake which is shown in Fig. 11. This brake comprises a wedge-shaped block 98 made of a resilient material such as rubber, backed by a steel plate 98a, and mounted on an elongated indented portion 99 of the stringer platform 14 by means of rivets 100 or the like so that free motion with a minimum of friction exists between the block 98 and platform 14. The elongated indented platform portion 99 contains a slot 101 in which the rivets 100 are slidable, to guide the wedge-shaped block 98 into and out of engagement with the wheel 23.

Figure 11A:
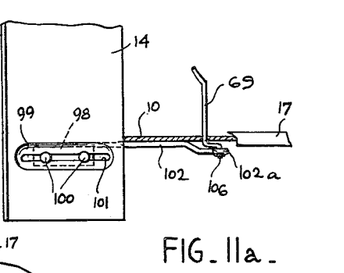
Fig. 11a is a plan view of a portion of the hand truck shown in Fig. 11, with parts thereof broken away and shown in section for convenience of illustration.

One end of a lever 102 is loosely and pivotally attached to the end of block 98 being held to a pivot pin 103 having a large clearance, the pin 103 being secured to said block by a washer 104 and cotter pin 105. The other end of said lever 102 has an upturned lateral extension 102a. As shown in Fig. 11a, the end of the crank bar 69 has an integral terminal crank 106 which projects outwardly of the stringer 10. The lever extension 102a is pivotally attached to the end of this crank 106 by means of a washer 107 and cotter pin 108. It is preferred to provide a crank 106 at each end of the crank bar 69, and a corresponding lever 102 and block 98 with each of said cranks.

In the extended positions of the roller units 85, the cranks 106 are directed downwardly so that their levers 102 place the resilient blocks 98 loosely wedged between the edge of wheels 23 and 24 and the stringer platform 14 so that gravity holds the block and wheel in contact. In this braking position, the angle of inclination of the abutting edges of the blocks 98 is such as to prevent the wheels 23 and 24 from rotating in a counterclockwise direction due to friction between the block and wheel producing a progressive wedge action. The wheels may turn freely in a clockwise direction because the block 98 is then lifted out of its normal wedging position, such lifting being permitted by the loose pivot pin 103. When the roller units are brought to their retracted position, the crank 106 shown in Fig. 11 rotates in a counterclockwise direction, raising and drawing the lever 102 rearwardly to the position shown in broken line in Fig. 11. This movement of lever 102 causes the attached block 98 to slide rearwardly along the slot 101 and entirely out of contact with the wheel 23. The wheels 23 and 24 are thus left free to rotate freely when the roller units 85 are in their retracted positions.

Figs. 16–20 show another type of roller unit, a pair of which may be used in the hand truck of the invention, to perform in the same manner as the roller units previously described. This roller unit 110 also contains two longitudinal rows of friction rollers. Instead of providing mounting blocks for the rollers or top wall openings to enable one of the rollers to rise above the plane of the other rollers, this function is achieved by shaping the rollers themselves as will be presently described.

The roller units 110 each have a housing 111 of rectangular shape similar to the housing 43 of the roller units shown in Figs. 1–8. The housing 111 has a central partition wall 112 dividing it into a pair of longitudinally extending roller channels 113 and 114. Each said channel contains a plurality of rollers 115 mounted therein by means of torsion springs 116, and alternately staggered in the manner previously described.

Figure 20:
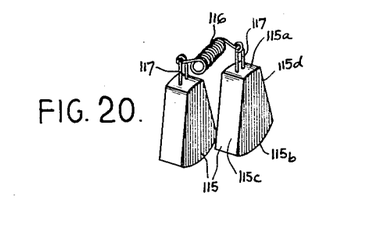
Fig. 20 is a perspective view of a pair of rollers of the roller unit shown in Fig. 16, the rollers being shown apart from the rest of the roller unit and joined by their mounting spring.

Each roller 115 is made of a solid block of rubber cut into the shape shown most clearly in Fig. 20. In plan view, the roller 115 is approximately pear-shaped, the shape being formed by cutting away opposed segments of a circular roller to provide a small arcuate top edge 115a, a larger arcuate bottom edge 115b joined by oppositely inclined straight side edges 115c and 115d.

Figures 16, 17, 18, 19:
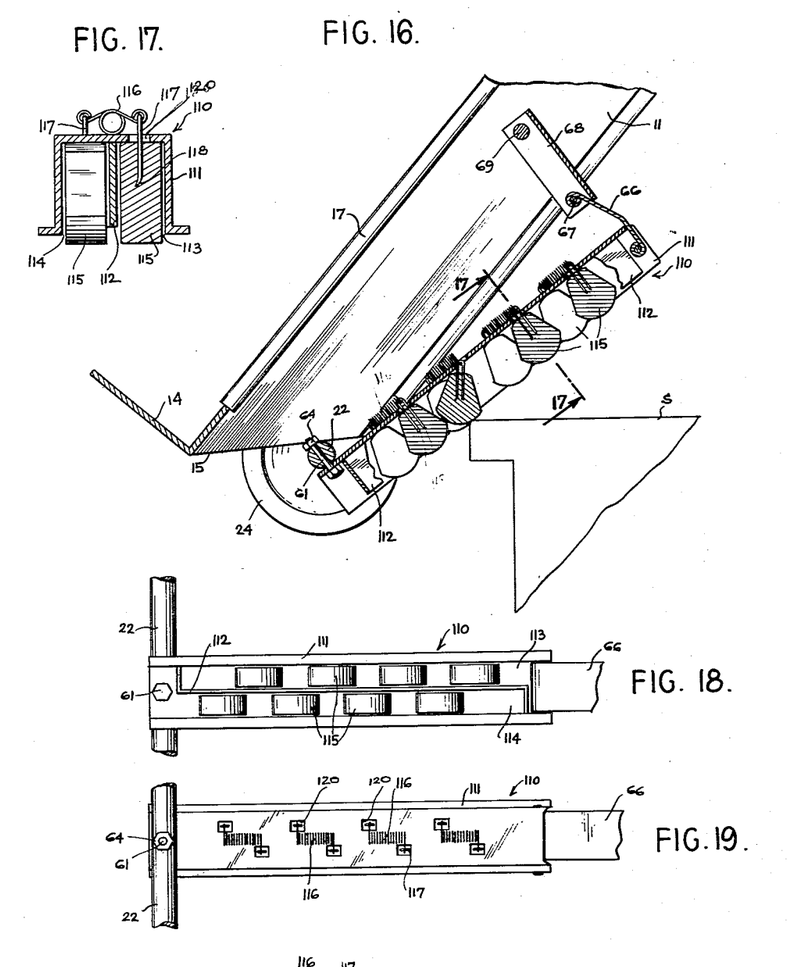
Fig. 16 is a sectional view of the lower portion of a hand truck showing a modified roller unit mounted thereon.
Fig. 17 is a section taken along line 17—17 of Fig. 16.
Fig. 18 is a bottom plan view of the roller unit shown in Fig. 16.
Fig. 19 is a top plan view thereof.

A steel wire clip 117 of inverted U-shape is internally molded in each roller and a short portion of the closed end of said clip 117 projects above said top edge 115a. The protruding section of each clip 117 extends through a rectangular opening 120 in the top wall of roller unit housing 111 and is held by the looped end of the torsion spring 116. As shown in Fig. 19, each spring 116 engages and holds at its opposite ends the clip 117 of a roller in one roller channel and the clip of an adjacent roller in the opposite roller channel.

In Fig. 16, one of the rollers 115 in roller channel 113 is shown in engagement with the corner edge of a step S, as the roller unit 110 is advanced up the step. It will be appreciated that the roller 115 upon first engaging the step edge will roll relatively to the roller unit housing 111 upon its top arcuate edge 115, until it comes to the end of said top edge 115 and reaches the juncture of said edge and the side edge 115c of the roller. As the side edge 115c comes into contact with the top edge of the housing 111, the engaged roller 115 in effect begins to rise above the plane of the other rollers and at the same time, the step edge or nosing is engaged by the next succeeding roller in the opposite roller channel 114. The spring 116 then returns the raised roller 115 to its original position. The operation of the roller units 110 in ascending or descending a flight of stairs is thus substantially the same as the two roller units previously described.

The drawings are substantially to scale, and reference is made thereto for further disclosure.

All appliance truck bodies, when ascending or descending stairs or the like assume an angle of approximately 15° from the vertical which is created by the operator's lifting action on the handles or grips at the top of each stringer or side plate. Such slight angular deviation from the vertical is insufficient to materially reduce the effort required to lift the load. In conventional appliance trucks, the crawler or glider assemblies corresponding to the roller units herein are mounted parallel to the side plates or stringers. In the hand truck of the present invention, it will be noted that the roller units in their extended positions extend outwardly from the rear edges of the stringers at an angle of approximately 20° thereto, which in combination with the aforementioned normal 15° creates a total of 35° deviation, so that the extended roller units are more nearly horizontal and a greater portion of the load weight is carried by the rollers rather than by the operator. In actual practice the additional angle provided requires approximately twenty percent less lifting force. The angle herein shown may be increased to further lessen the lifting effort. However, various stair dimensions limit the maximum angle. It has been found that by reduction of total body weight, increased lifting angle, and improved climber or stair gliding units, the disclosed invention reduces lifting effort by approximately one third.

It will be also noted that in all of the three types of roller units shown herein, the rollers are embedded deep within the roller unit housing so that only the lower portions of the rollers project from the housing. The roller units are thus adapted to withstand strong lateral thrusts which may result when the hand truck is turned from one flight of stairs to a perpendicular flight of stairs, so that the rollers engage the second flight at an oblique side angle. In conventional appliance trucks such lateral thrusts often result in damaging the roller bearings or dislodging the endless belt of the glider assembly, thus impairing the efficiency of the truck. In the instant invention, the rollers are guided in deep roller channels which prevent their turning or becoming dislodged.

While preferred embodiments of the invention have been shown and described herein, it is obvious that numerous omissions, changes and additions may be made in the invention without departing from the spirit and scope thereof.

I claim:

1. In an appliance hand truck, a roller unit comprising a housing, a plurality of rollers mounted in said housing in a plurality of rows with the rollers of each row staggered with adjacent rollers of the adjacent row, each of said rollers having a frictional outer circumferential surface, and resilient mounting means for each roller effective to permit limited longitudinal movement of one roller relative to the others and to return said roller to its original position, and means to raise the bottom surface of each roller above the bottom surface of the others when said roller is moved longitudinally.

2. An appliance hand truck for carrying a heavy load up a flight of stairs or the like, comprising a frame of supporting said load, and a pair of roller units mounted at each side of said frame, each roller unit having a plurality of longitudinally spaced rollers arranged in successive overlapping staggered relationship with adjacent rollers laterally spaced from each other, each said roller resting upon an upper housing portion and the bottom circumferential surfaces thereof being on a common plane and positioned to successively engage a step edge of the stairs as the hand truck is pulled upwardly therealong, resilient mounting means for each roller effective to permit each roller to be independently engaged and held from longitudinal movement by said step edge as said housing moves relative thereto, and means to raise the bottom circumference of said roller above said common plane as the next succeeding roller engages said step edge.

3. An appliance hand truck for carrying a heavy load up a flight of stairs or the like, comprising a frame for supporting said load, and a pair of roller units mounted at each side of said frame, each roller unit having a plurality of longitudinally spaced rollers arranged in successive overlapping staggered relationship with adjacent rollers laterally spaced from each other, each said roller resting upon an upper housing portion and the bottom circumferential surfaces thereof being on a common plane and positioned to successively engage a step edge of the stairs as the hand truck is pulled upwardly therealong, resilient mounting means for each roller effective to permit each roller to be independently engaged and held from longitudinal movement by said step edge as said housing moves relative thereto, and means to raise the bottom circumference of said roller above said common plane as the next succeeding roller engages said step edge, said resilient mounting means being also effective to return each raised roller to its original position.

4. An appliance hand truck for carrying a load up and down a flight of stairs or the like, said hand truck comprising a frame for supporting said load, a plurality of wheels attached to said frame, and a plurality of roller units mounted on the rear of said frame adjacent said wheels, each roller unit including a housing, a plurality of rollers arranged in laterally-spaced longitudinal rows in said housing, with the rollers in one row laterally overlapping the adjacent rollers in the next row, resilient mounting means for each roller effective to allow individual limited longitudinal movement of said roller in its row relative to the other rollers, means to raise each roller above the plane of the other rollers when said roller reaches the limit of its longitudinal movement relative to said mounting, said rollers being positioned to engage successively the edge of a step or said flight of stairs as the roller unit traverses said stairs, each roller having a resilient outer surface for frictionally gripping said step edge whereby said roller is held by said step edge from longitudinal movement as its housing moves along said step edge.

5. An appliance hand truck having a body frame including a pair of side plates, a pair of wheels mounted adjacent the bottoms of said side plates, a pair of roller units mounted adjacent the lower ends of said side plates and behind said wheels, each of said roller units comprising an elongated housing and a plurality of rollers mounted in said housing in longitudinal rows, with the rollers of each row staggered with adjacent rollers of the adjacent row, each of said rollers having a frictional outer circumferential surface, resilient mounting means for each roller effective to permit limited longitudinal movement of each roller relative to the others and to return said roller to its original position, means to raise the bottom surface of each roller above the bottom surface of the others when said roller is moved longitudinally, and means for pivotally mounting said housings on said frame for simultaneous movement of said housing between a retracted position in which said housings are substantially parallel to and overlie said side plates, and an extended position in which the upper ends of said housings are spaced rearwardly of said side plates and said housings are angularly disposed with relation to said side plates.

6. An appliance hand truck having a body frame including a pair of side plates, a pair of wheels mounted adjacent the bottoms of said side plates, a pair of roller units mounted adjacent the lower ends of said side plates and behind said wheels, each of said roller units comprising an elongated housing and a plurality of rollers mounted in said housing in longitudinal rows, each of said rollers having a frictional outer circumferential surface, resilient mounting means for each roller effective to permit limited longitudinal movement of each roller relative to the others and to return said roller to its original position, means to raise the bottom surface of each roller above the bottom surface of the others when said roller is moved longitudinally, and means for pivotally mounting said housings on said frame for simultaneous movement of said housings between a retracted position in which said housings are substantially parallel to and overlie said side plates, and an extended position in which the upper ends of said housings are spaced rearwardly of said side plates and said housings are angularly disposed in relation to said side plates, said mounting means including a pivot connecting the lower ends of said housings to said frame, a crank bar turnably mounted between the side plates and having a bowed central section, a pair of brackets carried by said crank bar at opposite ends thereof, and a pair of plates pivotally connected at one end to the respective brackets and at the other end to the top of the respective housings.

7. An appliance hand truck having a body frame including a pair of side plates, a pair of wheels mounted adjacent the bottoms of said side plates, a pair of roller units mounted adjacent the lower ends of said side plates and behind said wheels, each of said roller units comprising an elongated housing and a plurality of rollers mounted in said housing with their bottom surfaces projecting from said housing and facing rearwardly, means for pivotally mounting said housings on said frame for simultaneous movement of said housings between a retracted position in which said housings are substantially parallel to and overlie said side plates for moving the hand truck forwardly in descending a flight of stairs or the like, and an extended position in which the upper ends of said housings are spaced rearwardly of said side plates and said housings are angularly disposed with relation to said side plates for moving the hand truck rearwardly in ascending a flight of stairs or the like, and brake means for said wheels movably mounted on said frame and operatively connected to at least one housing for movement into braking engagement with said wheels when said housing is brought to its extended position, the brake means in their braking engagement being adapted to restrain the wheels from turning in a direction to permit forward movement of the hand truck.

8. In an appliance hand truck, a roller unit comprising a housing, a plurality of rollers mounted in said housing in a plurality of rows with the rollers of each row staggered with the adjacent rollers of the adjacent row, each of said rollers having an arcuate upper surface, an arcuate lower surface, and a pair of planar side surfaces connecting the upper and lower surfaces, the distance between said planar side surfaces being arcuater than the distance between the upper and lower arcuate surfaces, and spring means connected to the top of each roller and urging said roller to a position in which its arcuate top surface abuts the inner top surface of said housing, said spring means being effective to permit the top surface of back roller to turn against the housing top surface until one of the planar side surfaces of the roller engages said housing top surface.

9. In an appliance hand truck, a roller unit comprising a housing, a plurality of rollers mounted in said housing in a plurality of rows with the rollers of each row staggered with the adjacent rollers of the adjacent row, each of said rollers having an arcuate upper surface, an arcuate lower surface, and opposite planar side surfaces connecting the upper and lower surfaces, and resilient mounting means holding each roller with its arcuate upper surface abutting the inner surface of said housing, the resilient mounting means being effective to permit limited longitudinal turning movement of each roller relative to the other rollers and to return said roller to its original position, the distance between the planar side surfaces being smaller than the distance between the upper and lower arcuate surfaces whereby the bottom surface of a roller is raised above the bottom surface of the other rollers when said roller is moved longitudinally.

10. In an appliance hand truck, a roller unit comprising a housing, a plurality of rollers mounted in said housing in a plurality of rows with the rollers of each row staggered with the adjacent rollers of the adjacent row, each of said rollers having an arcuate upper surface, an arcuate lower surface of greater length than said upper surface, and a pair of inclined, planar side surfaces connecting the upper and lower surfaces, the distance between the planar side surfaces being smaller than the distance between the upper and lower surfaces, and resilient mounting means holding each roller with its arcuate upper surface abutting the inner top wall surface of said housing, the resilient mounting means being effective to permit limited turning movement of each roller relative to the others with the top arcuate surface of said roller turning against said housing top wall to a position in which one of the planar side surfaces engages said top wall and the bottom arcuate surface of said roller is raised above the bottom surfaces of the other rollers.

11. An appliance hand truck for carrying a heavy load up and down a flight of stairs or the like, comprising a frame for supporting said load, and a pair of roller units mounted at each side of said frame, each roller unit having a plurality of longitudinally spaced rollers arranged in successive overlapping staggered relationship with adjacent rollers laterally spaced from each other, each of said rollers having a top arcuate surface resting upon an upper housing portion, a bottom arcuate surface normally on a common plane with the other roller bottom surfaces and positioned to engage a step edge of the sairs as the hand truck is pulled upwardly therealong, and a pair of planar side surfaces connecting the top and bottom arcuate surfaces, resilient mounting means for each roller effective to permit each roller to be independently engaged and held from longitudinal movement by said step edge as the housing moves relative thereto, the distance between the planar side surfaces of each roller being smaller than the distance between the arcuate top and bottom surfaces thereof whereby engagement of a planar side surface of the roller with the upper housing portion raises the bottom surface of the roller above the common plane as the next succeeding roller engages said step edge.

(References on following page)

References Cited in the file of this patent

UNITED STATES PATENTS

| | | |
|---|---|---|
| 368,263 | Wetmore | Aug. 16, 1887 |
| 887,821 | Lang | May 19, 1908 |
| 2,229,244 | Husted | Jan. 21, 1941 |
| 2,467,644 | Wright et al. | Apr. 19, 1949 |
| 2,565,237 | Kinter | Aug. 21, 1951 |
| 2,623,760 | Fornelius | Dec. 30, 1952 |